Figure 1:
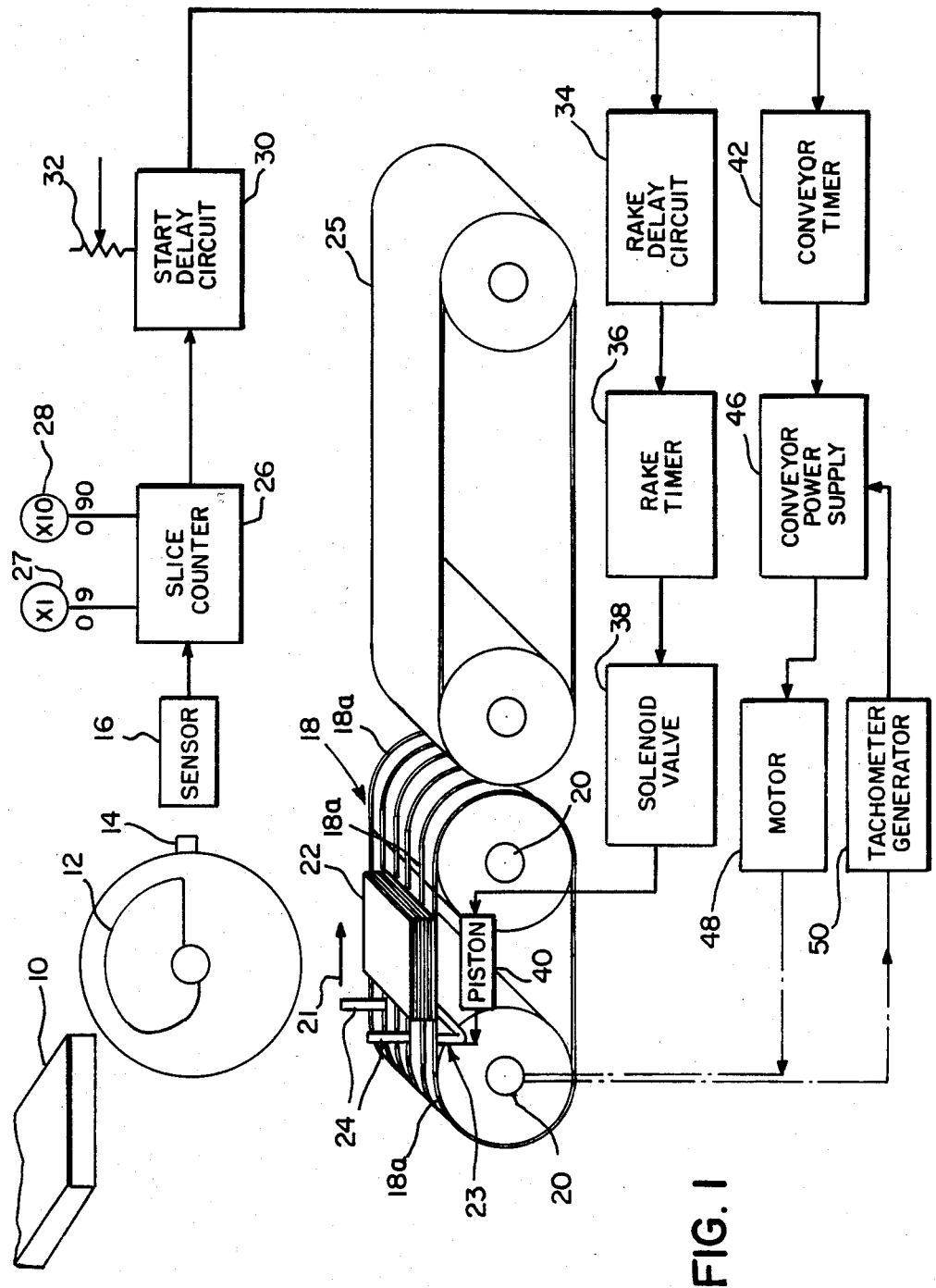

United States Patent [19]

Kent

[11] Patent Number: 4,518,300

[45] Date of Patent: May 21, 1985

[54] TAKE-AWAY TECHNIQUE FOR SLICED BULK PRODUCTS

[75] Inventor: David P. Kent, West Chester, Pa.

[73] Assignee: Control Process, Inc., West Chester, Pa.

[21] Appl. No.: 441,379

[22] Filed: Nov. 12, 1982

[51] Int. Cl.³ .............................................. B65G 47/88
[52] U.S. Cl. ....................................... 414/46; 198/422
[58] Field of Search .................... 414/46, 43, 49; 198/422, 423; 271/233, 269, 271

[56] References Cited

U.S. PATENT DOCUMENTS

| | | | |
|---|---|---|---|
| 2,686,543 | 8/1954 | Fay et al. | 198/422 X |
| 3,964,598 | 6/1976 | Alsop | 198/422 X |
| 4,026,421 | 5/1977 | Lotz | 414/43 X |
| 4,034,846 | 7/1977 | Burgis et al. | 414/43 X |

FOREIGN PATENT DOCUMENTS 2705509  8/1978  France ................... 414/49

Primary Examiner—Leslie J. Paperner
Assistant Examiner—Janice Krizek
Attorney, Agent, or Firm—Weiser & Stapler

[57] ABSTRACT

Take-away apparatus and method for stacks of sliced bulk product in which the stack rests on a movable conveyor, which is set in rapid motion before a slower-moving pusher engages the trailing edge of the stack.

14 Claims, 2 Drawing Figures

TAKE-AWAY TECHNIQUE FOR SLICED BULK PRODUCTS

The present invention relates to bulk product slicing machinery, and particularly to machinery for slicing bulk food products, such as meats and cheeses.

Such machinery is commonly intended to produce separate stacks of two or more slices of the product. This, in turn, means that the so-called "take-away" mechanism, by which each stack of sliced product, once formed, is removed from below the slicing blade in order to make room for the next stack, must operate in an intermittent manner, being stationary (or slow moving) while each stack is being formed, and fast moving while the stack is being removed. This requirement becomes more and more onerous as the speed of the slicing operation is stepped up. Indeed, in current commercial slicing machinery, this take-away problem can even become the limiting factor, preventing further speed-up, and thereby also preventing the efficiencies and resulting cost savings which accrue from higher operating speeds.

Various mechanisms have been proposed for the "take-away" function. One of these mechanisms consists of a belt-type conveyor which is positioned to receive the slices as they fall from the blade. This conveyor is alternately accelerated and decelerated. During the low-speed portion of its cycle, a stack forms (shingled if the conveyor moves slowly, straight-sided if the conveyor is stationary). During the high-speed portion of the cycle, this stack is carried away from beneath the blade, making room for the next stack. Typically, this take-away conveyor is made as short as possible, just long enough to remove the stack and deliver it to another conveyor, which can run continuously. In this manner, the inertia of the take-away conveyor is kept as low as possible, to facilitate quick starts and stops.

Nevertheless this mechanism is far from ideal. The complete accelerate-decelerate cycle must take place in the space of time between the fall of two consecutive slices, so that stacks which are intended to be separated do not overlap. This requires such high acceleration and deceleration rates that the product tends to slip on the conveyor, with resulting unpredictable upsets in stack formation.

Another fundamentally different mechanism does not rely on movement of the bed on which the slices are deposited to form each stack. Rather, a pushing mechanism is used to remove the stack from beneath the slicing blade. In one modern form of this mechanism, a stationary bed is provided for receiving the slices as they fall from the blade. This bed is made up of a plurality of support bars extending lengthwise in the direction of stack removal, and spaced apart to permit the fingers of a rake-like pushing mechanism to protrude upwardly between the support bars. This rake is movable reciprocatingly parallel to the bars.

During stacking, the rake is positioned at the end of its path of movement farthest from the discharge end of the take-away mechanism, and out of the way of the falling slices. When the desired stack has accumulated, the rake is quickly moved toward the stack, which it engages at its nearest edge and pushes off the support rods (usually onto a continuously moving conveyor as previously explained). The rake then quickly returns to its starting position, and the cycle recommences.

With this mechanism (as with any pushing mechanism) a different problem arises.

The impact of the rake fingers on the (trailing) edge of the stack tends to distort the stack, as well as the individual slices of which it is made up, while imparting to the stack the desired take-away movement. This is because the products being sliced (cheese, meat, or the like) have low mechanical rigidity, especially when present in the relatively thin configurations in which they typically emerge from the slicing blade. As a result, the impact of the rake fingers may cause the product to "wrinkle", at least at the trailing edge, or even over major parts of its surface. The wrinkling of individual slices in turn distorts the stack. All this tends to become more pronounced as the number of slices in a stack decreases, and/or as the speed of operation increases. In a two-slice stack, such as is typically formed for the thinly sliced steak portions to be used in steak sandwiches, pronounced distortion of slices and stacks can occur at relatively low speeds.

Accordingly, it is an object of this invention to provide a take-away mechanism for slicing machinery which is free of one or more of the above-described problems.

This and other objects which will appear, are achieved in accordance with the invention by ingeniously combining certain features of the two types of take-away mechanisms previously described. In particular, the bed onto which the product slices fall and on which they accumulate into a stack is formed of a movable conveyor. To that extent, the invention resembles the prior take-away conveyor mechanisms. However, a pusher mechanism is also provided for engaging each stack and sliding it away from beneath the slicing blade. In this respect, the invention resembles the prior take-away pushing mechanisms. The difference is that, in accordance with the present invention, the two component elements are coordinated in a new and ingenious manner. Specifically, the maximum speed to which the pushing mechanism is caused to accelerate is intentionally made lower than the desired take-away movement speed. The movable conveyor, on the other hand, is controlled so that it accelerates as quickly as possible to its maximum speed, higher than that of the pushing mechanism and substantially equal to the desired speed of take-away movement of the stacked product. Indeed, the acceleration of the conveyor is intentionally made so high that the product stack formed thereon is incapable of fully keeping pace with it. Rather, one or more of the stacked slices initially lag behind, and are engaged by the pushing means, which temporarily takes over the movement-imparting function toward the discharge end of the take-away conveyor, until the conveyor itself again becomes the movement-imparting influence.

Preferably, the pushing means has the same general rake configuration as in the prior art and the movable conveyor is made of spaced strips between which the rake fingers protrude upwardly to engage the trailing edge of the stack.

In this way, it is believed that exceptionally high stack removal rates can be achieved, without the accompanying problems of the prior mechanisms.

For a better understanding of the present invention, together with other and further objects thereof, reference is made to the following description, taken in connection with the accompanying drawings, and it scope will be pointed out in the appended claims.

Figure 2:
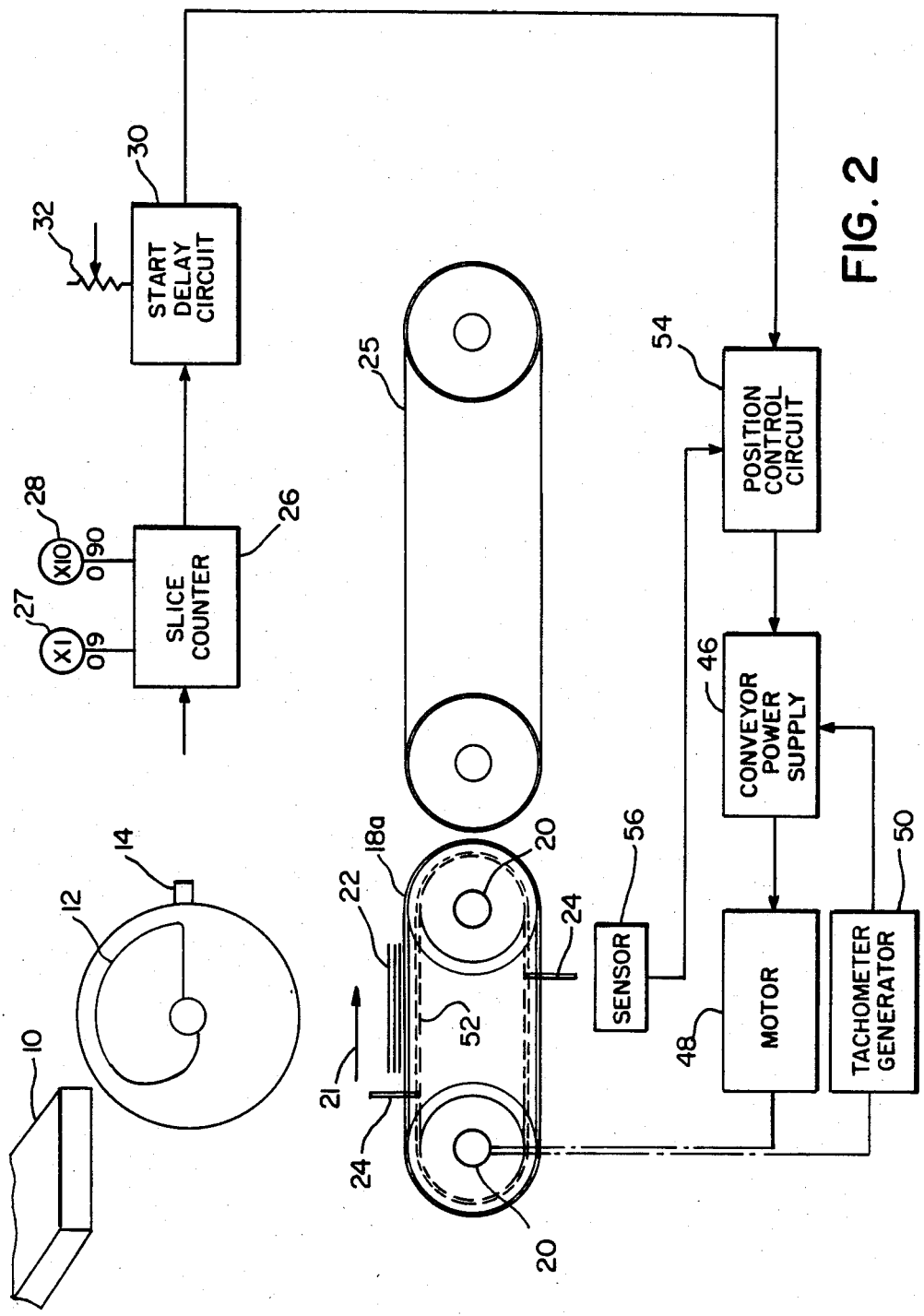

Referring to the drawings:

FIG. 1 is a diagrammatic representation of a first embodiment of the present invention; and FIG. 2 is such a representation of a second embodiment.

Similar reference numerals are used to designate corresponding parts in the two figures.

Referring to FIG. 1, bulk product to be sliced is diagrammatically illustrated at 10. It is caused to advance in conventional manner into the path of a slicing blade 12. This blade carries a member 14 which triggers a sensor 16 each time that the slicer makes a complete revolution. The combination of member 14 and sensor 16 serves to develop a count of the slices made by blade 12. All the foregoing may take any conventional form.

In accordance with the present invention, the means for receiving slices of the bulk product from blade 12 to form a stack of slices and for removing the stack from beneath the blade includes a movable surface upon which the stack of slices is formed. In the embodiment of the invention shown in FIG. 1, this movable surface is in the form of an endless conveyor 18, composed of a plurality of spaced belts 18a, which circulate about a pair of rollers 20 in the direction of arrow 21. As blade 12 slices the bulk product 10, a stack 22 of slices is formed on the tops of belts 18a.

Pushing means for engaging the trailing edge of stack 22 are also provided. This includes a rake 23 having a plurality of fingers 24 extending upwardly between belts 18a. Rake 23, with its fingers 24, is mounted for reciprocating movement between a first position (in which it is shown in FIG. 1) in which the fingers are upstream from stack 22, and a second position spaced from the first position in the direction of movement of the uppermost runs of belts 18a. A second endless conveyor 25 adjoins the conveyor 18 at the downstream end of the latter.

Control means are provided for actuating both conveyor 18 and rake 23 after a prescribed number of slices have been stacked. The control means includes a slice counter 26 which responds to sensor 16 to develop a control signal when the desired slice count has been achieved. Slice counter 26 may be set with the desired slice count by a "units" input setting knob 27 and a "tens" input setting knob 28. The number of revolutions of blade 12 is accumulated until it corresponds to the input setting, at which time slice counter 26 develops the control signal and supplies this signal to a start delay circuit 30. This circuit serves to delay the control signal by an amount of time which corresponds to the fall-time of a slice from blade 12 to belts 18a. The time delay of start delay circuit 30 is established by a potentiometer 32.

The control signal from circuit 30 is supplied through a conveyor timer 42 to a conveyor power supply 46 which powers a motor 48 to drive belts 18a. Conveyor timer 42 serves to develop a signal having a duration corresponding to the desired running time of conveyor 18. The speed of motor 48 is regulated in response to a feedback signal which is produced by a tachometer generator 50 and supplied to conveyor power supply 46.

The control signal from circuit 30 is also supplied through a rake delay circuit 34 and a rake timer 36 to a solenoid valve 38 which drives a piston 40 to which rake 23 is coupled. Piston 40 drives rake 23 and its fingers 24 in the direction of arrow 21. Circuit 34 serves to delay the movement of fingers 24 until after movement of belts 18a has begun. Rake timer 36 serves to develop a signal having a duration corresponding to the desired amount of travel of fingers 24. Upon termination of the signal from rake timer 36, solenoid valve 38 is deactivated and piston 40 return fingers 24 to their starting position.

The relationships between the different signals and the characteristics of the various components of FIG. 1 are so selected that conveyor 18 begins its movement before the movement of rake 23 has caused its fingers 24 to engage the trailing edge of stack 22. Moreover, the speed at which rake 23 moves, once started, is lower than that to which conveyor 18 is accelerated, so that fingers 24 would not normally overtake the stack 22 moving under the influence of conveyor 18. However, the acceleration of conveyor 18 is intentionally made so high that the stack 22 initially slips with respect to the conveyor and lags behind its movement sufficiently for fingers 24 to catch up and engage the trailing edge of stack 22. Thereupon, fingers 24 temporarily push the stack 22 toward the discharge end of the conveyor 18. Shortly, however, the conveyor 18 again becomes the moving force for the stack, and it is the conveyor which ultimately propels the stack onto adjoining conveyor 25. Conveyor 25 may run continuously, and simply further transports stacks from conveyor 18, as these are discharged from the latter.

As previously explained, it is believed that this relationship between movements of conveyor and rake produce unexpectedly beneficial results, not available by using either a conveyor alone, or a rake alone. In particular, the overall take-away operation permits accelerating the take-away conveyor much more rapidly than if this conveyor were acting as the only take-away means. At the same time, the rake may be run at a speed so low that it does not produce wrinkling while it engages the trailing edge of the stack. Yet the rake does serve to realign the stack if there has been slippage between slices due to the high acceleration of the conveyor itself. As a result, higher cycling rates are believed to be possible with fewer undersirable side effects than heretofore.

In the embodiment of FIG. 2, to which reference may now be made, fingers 24 are mounted on an endless conveyor 52 positioned within belts 18a. For the embodiment shown in FIG. 2, two sets of fingers 24 are mounted on conveyor 52, spaced half-way around conveyor 52.

The signal from circuit 30 is supplied through position control circuit 54 to conveyor power supply 46, which powers motor 48 to drive belts 18a and conveyor 52. After stack 22 has been delivered to conveyor 25, fingers 24 continue past a sensor 56 which senses the fingers and develops a signal for stopping movement of belts 18a and conveyor 52. This is accomplished by triggering position control circuit 54 to turn off conveyor power supply 46. The apparatus is arranged so that belts 18a and conveyor 52 stop with the next set of fingers 24 positioned to engage, when next actuated again, the trailing edge of the next stack to be formed. Because the diameter of the rollers around which fingers 24 circulate is smaller than that of the rollers around which conveyor belts 18a run, the former will move more slowly than the latter.

It will be understood that, if conveyor 18 is long enough, additional sets of fingers 24 can be provided, thereby, in effect, forming multiple compartments for consecutive stacks along the top of conveyor 18.

While in the foregoing there have been described preferred embodiments of the invention, it should be understood by those skilled in the art that various modifications and changes can be made without departing from the scope of the invention as defined in the claims.

I claim:

1. Take-away system for stacks of sliced bulk product comprising:

a support surface for receiving slices of said bulk product to form a stack of said slices, said surface being intermittently movable in a predetermined direction to displace a stack in said direction;

second means also intermittently movable in said direction and extending above said surface so as to be capable of engaging the trailing edge of a stack and pushing it in said direction;

means for controlling the movement of the support surface so as to be faster than that of the second means, whereby the second means overtakes the stack which is being displaced by the support surface movement and engages the trailing edge of said stack only as a result of slippage of the stack on the support surface; and means for actuating said support surface and said second means after a predetermined slice count.

2. The system of claim 1 including means for initiating each said intermittent movement of said support surface before the next said intermittent movement of the second means.

3. The system of claim 1, wherein said movable surface is the top of an endless conveyor.

4. The system of claim 3 wherein said conveyor comprises a plurality of spaced-apart belts.

5. The system of claim 4 wherein said second means includes a plurality of fingers extending upwardly between said spaced belts.

6. The system of claim 5 wherein said fingers are mounted for reciprocating movement between a first position upstream of said stack and a second position spaced from said first position in the direction of movement of said spaced belts.

7. The system of claim 5 wherein said fingers are mounted for unidirectional movement in the same direction as said spaced belts.

8. The system of claim 7 wherein said fingers are mounted on a second endless conveyor positioned within said spaced belts.

9. The system of claim 8 wherein said second means includes a plurality of sets of fingers spaced uniformly along the length of said second conveyor.

10. A take-away system for stacks of sliced bulk product comprising:

conveyor means forming a support for receiving slices of said bulk product to form a stack of said slices beneath a slicing means, means for intermittently moving said conveyor means in a predetermined direction to displace a stack in said direction;

pushing means having finger means for engaging the trailing edge of the stack and pushing it toward a discharge end of said conveyor, means associated with said pushing means for causing reciprocating movement of said finger means in relationship to the intermittent movement of said conveyor, and means for controlling the movement of said conveyor means so as to be faster than the movement of said finger means, whereby said finger means overtakes the stack which is being displaced on said conveyor and engages the trailing edge of said stack only as a result of slippage of the stack on the conveyor surface; and means for actuating movement of said conveyor means and said pushing means after a predetermined slice count has been obtained.

11. The system of claim 10 wherein said finger means comprises a plurality of fingers extending upwardly from said conveyor means.

12. The system of claim 10 wherein said conveyor means further includes an endless belt which is continuously moving.

13. The system of claim 10 including sensor means which senses the slice count on said stack so as to initiate movement of said conveyor means.

14. The system of claim 10 wherein said control means causes said pushing means to operate so as to prevent wrinkling of said slices.

* * * * *